United States Patent
Kemal

(10) Patent No.: US 10,154,300 B2
(45) Date of Patent: Dec. 11, 2018

(54) DYNAMIC CONTENT INSTALLER FOR MOBILE DEVICES

(75) Inventor: Andrew P. Kemal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1133 days.

(21) Appl. No.: 13/271,219

(22) Filed: Oct. 11, 2011

(65) Prior Publication Data

US 2013/0091235 A1    Apr. 11, 2013

(51) Int. Cl.
| | |
|---|---|
| *H04N 21/414* | (2011.01) |
| *H04N 21/433* | (2011.01) |
| *H04N 21/6543* | (2011.01) |
| *H04L 29/08* | (2006.01) |
| *H04W 4/50* | (2018.01) |

(Continued)

(52) U.S. Cl.
CPC ... *H04N 21/41407* (2013.01); *H04L 67/1097* (2013.01); *H04N 21/4334* (2013.01); *H04N 21/6543* (2013.01); *H04W 4/50* (2018.02); *H04W 4/60* (2018.02); *H04L 67/06* (2013.01); *H04W 4/02* (2013.01)

(58) Field of Classification Search
CPC ............. H04W 4/003; H04N 21/41407; H04L 67/1097
See application file for complete search history.

(56) References Cited

U.S. PATENT DOCUMENTS

| | | |
|---|---|---|
| 6,886,017 B1 | 4/2005 | Jackson et al. |
| 7,363,035 B2 | 4/2008 | Reilly |
| 7,779,408 B1 | 8/2010 | Papineau |

(Continued)

FOREIGN PATENT DOCUMENTS

| | | | |
|---|---|---|---|
| CN | 101853296 A | 10/2010 | |
| EP | 1875758 B1 * | 7/2012 | ........... H04L 63/126 |

(Continued)

OTHER PUBLICATIONS

International Search Report and Written Opinion—PCT/US2012/058684—ISA/EPO—dated Feb. 14, 2014.

(Continued)

*Primary Examiner* — Asad M Nawaz
*Assistant Examiner* — Saad A. Waqas
(74) *Attorney, Agent, or Firm* — The Marbury Law Group, PLLC

(57) ABSTRACT

Apparatus and methods for obtaining a content item in a mobile environment include receiving a content item of a first type and content management information that corresponds to the content item. The content management information specifies a destination storage location for content items of the first type, and the destination storage location is different from a default storage location for the content items of the first type. Further, these aspects include storing the content item on the communication device at the destination storage location based on the content management information, and executing an application on a computing platform of the communication device. The application interacts with the content item at the destination storage location based on the content management information. Additional apparatus and methods relating to distributing content are also disclosed.

21 Claims, 8 Drawing Sheets

(51) Int. Cl.
*H04W 4/60* (2018.01)
*H04W 4/02* (2018.01)

(56) References Cited

U.S. PATENT DOCUMENTS

| | | | |
|---|---|---|---|
| 8,949,825 B1* | 2/2015 | Fitzgerald | G06F 9/45537 718/1 |
| 2004/0255291 A1* | 12/2004 | Sierer | G06F 8/61 717/174 |
| 2005/0097225 A1 | 5/2005 | Glatt et al. | |
| 2009/0320017 A1 | 12/2009 | Jackson et al. | |

FOREIGN PATENT DOCUMENTS

| | | |
|---|---|---|
| JP | H07334436 A | 12/1995 |
| JP | H08190472 A | 7/1996 |
| JP | 2001350534 A | 12/2001 |
| JP | 2002140532 A | 5/2002 |
| JP | 2006085610 A | 3/2006 |
| JP | 2006302297 A | 11/2006 |
| JP | 2008065736 A | 3/2008 |
| JP | 2011076576 A | 4/2011 |
| WO | WO03029971 A1 | 4/2003 |
| WO | 2008139640 A1 | 11/2008 |

OTHER PUBLICATIONS

Anonymous: "App2SD—Komplett-Uberblick verschiedener Methoden", Android—Hilfe Jul. 11, 2011 (Jul. 11, 2011), pp. 1-4, XP002711503, [retrieved on Aug. 19, 2013].
Partial International Search Report—PCT/US2012/058684—ISA/EPO—dated Sep. 11, 2013.

* cited by examiner

DYNAMIC CONTENT INSTALLER FOR MOBILE DEVICES

BACKGROUND

The present disclosure relates to a communication environment, and more particularly, to providing improved apparatus and methods of distributing content to networked devices, communication devices or mobile devices.

Mobile operators or wireless network carriers play a major part in the telecommunication industry today. Initially, such mobile operators concentrated their efforts on generating revenue by increasing their subscriber base. However, it will be appreciated that in several countries the scope for increasing the subscriber base has now become very limited, as the market has reached close to the saturation point. As a result, the mobile operators have been branching into providing value added services to subscribers in order to increase their revenue.

One manner of generating increased revenue is through the sales of premium content items to users, such as ringtones, wallpaper, games, etc. . . . These content items may be provided by the mobile operator, or by business entities that may operate in collaboration with the mobile operators. In an aspect, for example, the content items may be available for download to a communication device of a user upon payment of a fee.

Computing platforms for mobile devices or communication devices tend to impose limitations upon installation and use of content items. Generally, the user interface, available storage, and usage paradigm assumes that each type of content item is handled in the same way (e.g., having a default storage location) by a default application, which typically is installed by the original equipment manufacturer (OEM). For example, a short audio file is stored by the file system of the communication device with other short audio files for subsequent playback by a ringtone application. Another type of longer format media content can be specified for storage for playback by a music or video player, for instance.

Thus, improvements in installation and usage of content items are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method for obtaining a content item in a mobile environment that includes receiving, by a communication device, a content item of a first type and content management information that corresponds to the content item. In this aspect, the content management information specifies a destination storage location for content items of the first type and the destination storage location is different from a default storage location for the content items of the first type. A utility stores the content item on the communication device at the destination storage location based on the content management information. An application that executes on a computing platform of the communication device interacts with the content item at the destination storage location based on the content management information.

In another aspect, the present disclosure provides at least one processor for obtaining a content item in a mobile environment. A first module receives, by a communication device, a content item of a first type and content management information that corresponds to the content item. In this aspect, the content management information specifies a destination storage location for content items of the first type and the destination storage location is different from a default storage location for the content items of the first type. A second module stores the content item on the communication device at the destination storage location based on the content management information. A third module executes an application that interacts with the content item at the destination storage location based on the content management information.

In a further aspect, the present disclosure provides a computer program product for obtaining a content item in a mobile environment. A non-transitory computer-readable storage medium stores instructions. At least one instruction causes a computer to receive a content item of a first type and content management information that corresponds to the content item. In this aspect, the content management information specifies a destination storage location for content items of the first type and the destination storage location is different from a default storage location for the content items of the first type. At least one instruction causes the computer to store the content item on the communication device at the destination storage location based on the content management information. At least one instruction causes the computer to execute an application that interacts with the content item at the destination storage location based on the content management information.

In yet another aspect, the present disclosure provides an apparatus for obtaining a content item in a mobile environment. The apparatus includes means for receiving a content item of a first type and content management information that corresponds to the content item. In this aspect, the content management information specifies a destination storage location for content items of the first type and the destination storage location is different from a default storage location for the content items of the first type. The apparatus further includes means for storing the content item on the communication device at the destination storage location based on the content management information. The apparatus additionally includes means for executing an application that interacts with the content item at the destination storage location based on the content management information.

In an additional aspect, the present disclosure provides an apparatus for obtaining a content item in a mobile environment. A file system stores one or more content items. A receiver receives a content item of a first type and content management information that corresponds to the content item. In this aspect, the content management information specifies a destination storage location for content items of the first type and the destination storage location is different from a default storage location for the content items of the first type. A utility stores the content item on the communication device at the destination storage location based on the content management information. A computing platform of the communication device executes an application that interacts with the content item at the destination storage location based on the content management information.

In yet an additional aspect, the present disclosure provides a method for distributing a content item in a mobile environment. The method includes accessing content management information for a selected computing platform of a communication device, and executing a design interface for designing an installation utility based on the content management information. Further, the method includes receiving a destination storage location specified for a type of a content item associated with the installation utility. In this aspect, the destination storage location is allowed by a file system of the selected computing platform and the destination storage location differs from a default storage location on the selected computing platform for the type of the content item. Additionally, the method includes deploying the installation utility to at least one communication device having the selected computing platform. In this aspect, the installation utility is capable of storing a received content item having a same type as the type of the content item at the destination storage location based on the content management information In yet a further aspect, the present disclosure provides at least one processor for distributing content in a mobile environment. A first module accesses content management information for a selected computing platform of a communication device, and a second module executes a design interface for designing an installation utility based on the content management information. Further, a third module receives a destination storage location specified for a type of a content item associated with the installation utility. In this aspect, the destination storage location is allowed by a file system of the selected computing platform, and the destination storage location differs from a default storage location on the selected computing platform for the type of the content item. Additionally, a fourth module deploys the installation utility to at least one communication device having the selected computing platform. In such aspect, the installation utility is capable of storing a received content item having a same type as the type of the content item at the destination storage location based on the content management information.

In another aspect, the present disclosure provides a computer program product for distributing content in a mobile environment. A non-transitory computer-readable storage medium is for storing instructions. At least one instruction causes a computer to access content management information for a selected computing platform of a communication device. Further, at least one instruction causes the computer to execute a design interface for designing an installation utility based on the content management information. Also, at least one instruction causes the computer to receive a destination storage location specified for a type of a content item associated with the installation utility. In this aspect, the destination storage location is allowed by a file system of the selected computing platform, and the destination storage location differs from a default storage location on the selected computing platform for the type of the content item. Additionally, at least one instruction causes the computer to deploy the installation utility to at least one communication device having the selected computing platform. In such aspect, the installation utility is capable of storing a received content item having a same type as the type of the content item at the destination storage location based on the content management information.

In an additional aspect, the present disclosure provides an apparatus for distributing content in a mobile environment. The apparatus includes means for accessing content management information for a selected computing platform of a communication device, and means for executing a design interface for designing an installation utility based on the content management information. Further, the apparatus includes means for receiving a destination storage location specified for a type of a content item associated with the installation utility. In this aspect, the destination storage location is allowed by a file system of the selected computing platform, and the destination storage location differs from a default storage location on the selected computing platform for the type of the content item. Additionally, the apparatus includes means for deploying the installation utility to at least one communication device having the selected computing platform. In such aspect, the installation utility is capable of storing a received content item having a same type as the type of the content item at the destination storage location based on the content management information.

In a further aspect, the present disclosure provides an apparatus for distributing content in a mobile environment. The apparatus includes a data structure comprising content management information for a selected computing platform of a communication device, and a design interface executable for designing an installation utility based on the content management information. Further, the design interface is also capable of receiving a destination storage location specified for a type of a content item associated with the installation utility and for determining that the destination storage location is allowed by a file system of the selected computing platform. In this aspect, the destination storage location differs from a default storage location on the selected computing platform for the type of the content item. Additionally, the apparatus includes a network interface for deploying the installation utility to at least one communication device having the selected computing platform. In this aspect, the installation utility is capable of storing a received content item having a same type as the type of the content item at the destination storage location based on the content management information.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
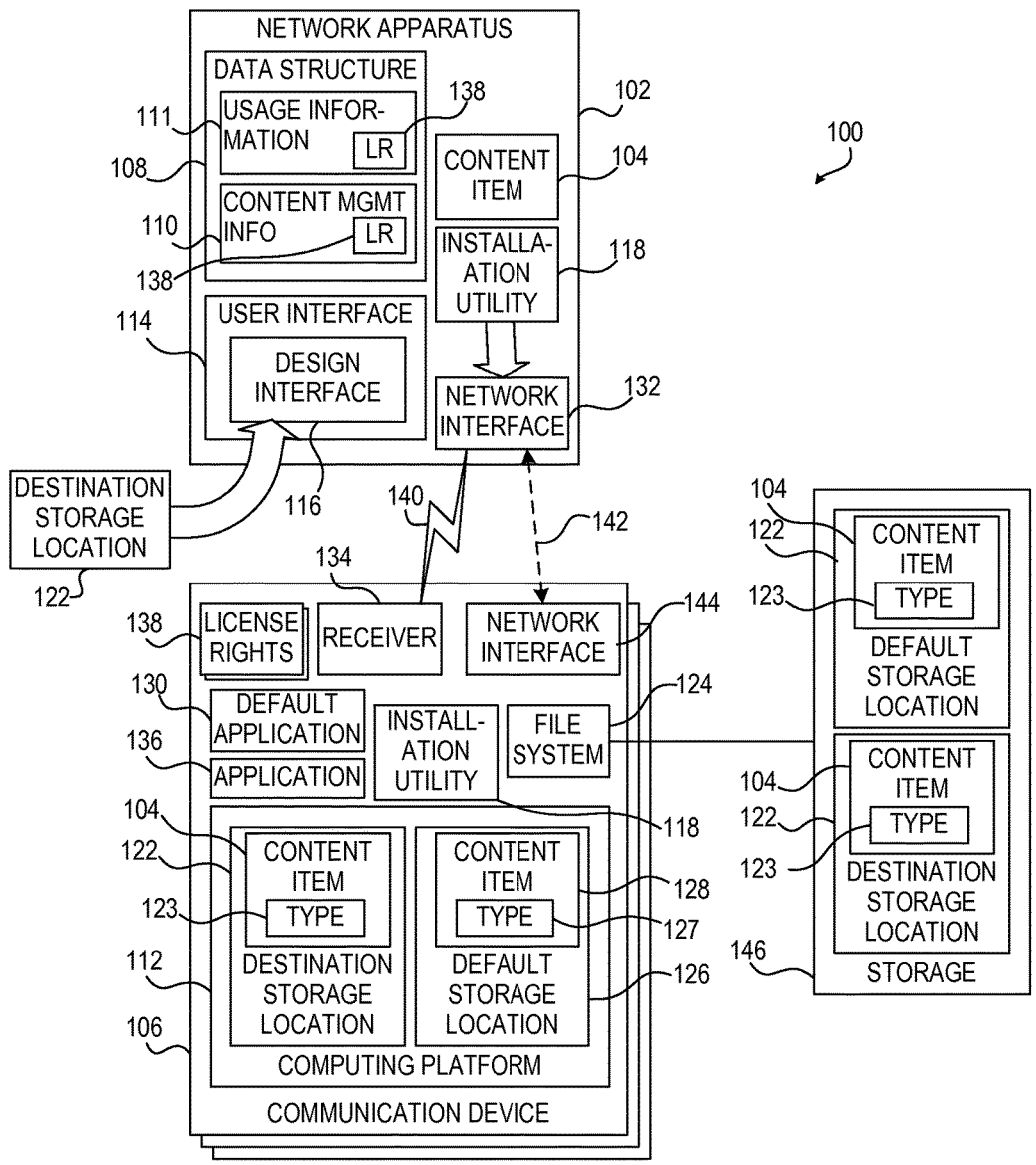
FIG. 1 illustrates a schematic diagram of a communication system including a network apparatus for distributing content that is received by a user apparatus, according to one aspect.

A dynamic content installer can address a deficiency in conventional mobile computing platforms that are required to inherently know where to put downloaded content item and how to utilize the content item, for example, based on license restrictions. As such, installation functions, and to some extent, licensing enforcement functions, are performed by these conventional mobile computing platforms, based on, for instance, pre-installed code. In a departure from these conventional systems, in an aspect, the described dynamic content installer provides a way to have the computing platform act more generically in its treatment of content items and to allow the computing platform to download installation and usage instructions on any particular piece of content. Thereby, the receiving mobile or communication device computing platform can use such instructions to determine how and where to install the associated content item, what type of licensing enforcement may be used for the associated content item, and otherwise how the content item can be used, accessed, invoked, read, written, deleted, etc.

In an aspect of the present disclosure, a dynamic content installer may be associated with a content item with which the dynamic content installer was downloaded and/or a same type of content item that can be downloaded separately. In an aspect, one advantage of the dynamic content installer is that a communication device computing platform may only need to know about an installation definition mechanism (e.g., how to interpret the installation and/or usage instructions, etc.) of the dynamic content installer and not a pre-installed code or a "hard-coded" installation mechanism. Thus, in an aspect, the communication device computing platform may have the ability to use a wide variety of content items in a dynamic fashion as defined by the installation or usage information (e.g., content management information) associated with each content item, assuming the content item adheres to the architecture limitations imposed by that computing platform.

In an aspect, which should not be construed as limiting, a communication device comes provisioned with standard utilities for managing audiovisual media content items, text content items, ringtone content items, wallpaper image content items, etc. Receiving and executing a dynamic content installer allows the communication device to expand the types of content items that can be consumed by the communication device, or expand the number of applications that can use a same type of content item.

For example, a content item in the form of a sound file, such as a ringtone, may be associated with a limited use license, such as for a number of plays. The described dynamic content installer, in one aspect, enables storing this content item in a location different from a default sound file location typically associated with such a sound file. Further, the described dynamic content installer may also define which application can access the content item, such as an application that is different from a default generic ring tone service application. In this manner, the dynamic content installer can provide a new service without interfering with the generic ring tone service (and the default sound file location) pre-provisioned on the communication device.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

According to one aspect depicted in FIG. 1, in a communication system 100, a network apparatus 102 distributes a content item 104 in a mobile environment to one or more mobile devices or communication devices 106. The network apparatus 102 may include a data structure 108 having content management information 110, such as installation and usage information associated with the content item 104, that can be accessed by a computing platform 112 of the communication device 106. Further, in an aspect, the network apparatus 102 may include a user interface 114 that presents a design interface 116 ("installer tool") that is executable for designing an installation utility 118 for use with the content item 104. For example, the installation utility 118 is executable by the computing platform 112 of the communication device 106 to manage the installation or usage of the content item 104 according to the content management information 110. Additionally, the user interface 114 may receive a destination storage location 122 existing in or to be defined in the computing platform 112 that is specified for a type 123 of the content item 104, which may be included with or used by the installation utility 118 for installing the content item 104 or other similar types of content items. In an aspect, the design interface 116 determines that the destination storage location 122 is allowed by a memory or file system 124 of the selected computing platform 112. The design interface 116 may need to have information about certain computing platforms file-system and memory requirements and privileges so that it may make a determination as to the validity of the destination storage location being supplied.

In at least certain instances, this destination storage location 122 differs from a default storage location 126 for similar types 127 of content items 128 that are used by a default application 130 used by the communication device 106. What is meant by default storage location 126 is that the computing platform can mandate that a specific location is for a certain type of content item. For example, ringtones and wallpaper images can be in predefined folders. For another example, a shared folder can be pre-assigned and dedicated by the computing platform. The installation utility 118 can override these defaults and allow applications access to use other locations to store a given type of content item. The installation utility 118 allows the computing platform to continue mandating of specific locations for types of content items, while allowing the installation utility 118 to override these mandates.

Accordingly, in an aspect, installation utility 118 may be separate from or include one or more of the content management information 110 and the destination storage location 122. As such, installation utility 118 may be utilized by the computing platform 112 of the communication device 106 to manage installation and use of the content item 104. A network interface 132, which may include a transmitter, sends one or more of the installation utility 118, the content management information 110 and the destination storage location 122 to the communication device 106 for use by the computing platform 112. For example, in an aspect, the installation utility 118 may either be sent with the content item 104 (e.g., a first content item) or sent prior to sending the content item 104 (e.g., a second content item).

Similarly, a user apparatus, depicted as one of the communication devices 106, operates in one aspect to receive and execute content in a mobile environment. For example, a receiver 134 of the communication device 106 receives the content item 104 and content management information 110 that specifies the destination storage location 122 for the content item 104. The memory or file system 124 stores the content item 104 on the communication device 106 at the destination storage location 122. For example, in an aspect, the installation utility 118 can be received with the content item 104 (e.g., a first content item) for purposes of implementing this content management information 110. Alternatively or in addition, the installation utility 118 (or merely "utility") can be installed before receiving the content item 104 (e.g., a second content item).

In another aspect, the installation utility 118 communicates with an application 136 (e.g., not a default application) that is executed on the computing platform 112 of the communication device 106 in accordance with the content management information 110 for interacting with the content item 104. For instance, a default application can be one that is pre-configured to look in a specific directory or for a specific file type.

Thus, the installation utility 118 may also include, define, or serve as an Application Program Interface (API) for applications 136 that do not use a default association. In contrast, in an aspect, the computing platform 112 also stores other content items 128, according to a respective type of the content item 128, in one or more default storage location(s) 126 associated with the type for execution by a default application 130 that calls for usage of the type of content item 128. The applications 136 can be pre-configured to look for the installation utility 118. For example, a Software Development Kit (SDK) provided to developers can enable them to use the APIs of the Installation Utility. These APIs will be generic and hence the developers will include calls to these APIs to get the content usage information when running on the device.

In managing how a content item is used, the installation utility 118 can perform one or more of managing execution, playback, modification, distribution, deletion, revocation, upgrade, update, identity of applications allowed to access, monitoring a level of subscription for a particular user, reporting use, etc.

In one aspect, one or both of the content management information 110 or the usage information 111 may further comprise a license policy or one or more license rights 138 (e.g., time period, unlimited time, unlimited use, number of uses, duration of uses, etc.) for the content item 104 for managing by the installation utility 118. For instance, the license rights 138 can enable different licensing limitations than the licensing limitations imposed upon content items 128, e.g. similar types of content, stored in the default storage location 126.

In another aspect, the network interface 132 of the network apparatus 102 may send one or more of the installation utility 118, the content management information 110, the usage information 111, the destination storage location 122 and the content item 104 by a transmission over a wireless link 140 to the receiver 134 of the communication device 106. Alternatively or in addition, the network interface 132 of the network apparatus 102 may send one or more of the installation utility 118, the content management information 110, the usage information 111, the destination storage location 122 and the content item 104 by transmitting over a wired link 142 to a network interface 144 of the communication device 106.

For clarity, the destination storage location 122 and default storage location 126 are depicted as being on the computing platform 112. It should be appreciated that either or both of the destination storage location 122 and the default storage location 126 can reside on external, removable, or remote storage 146.

In one aspect, the installation utility 118 can provide content management information, such as installation information 110, usage information 111, and destination storage location 122 for more than one type 123 of content item 104.

Figure 2:
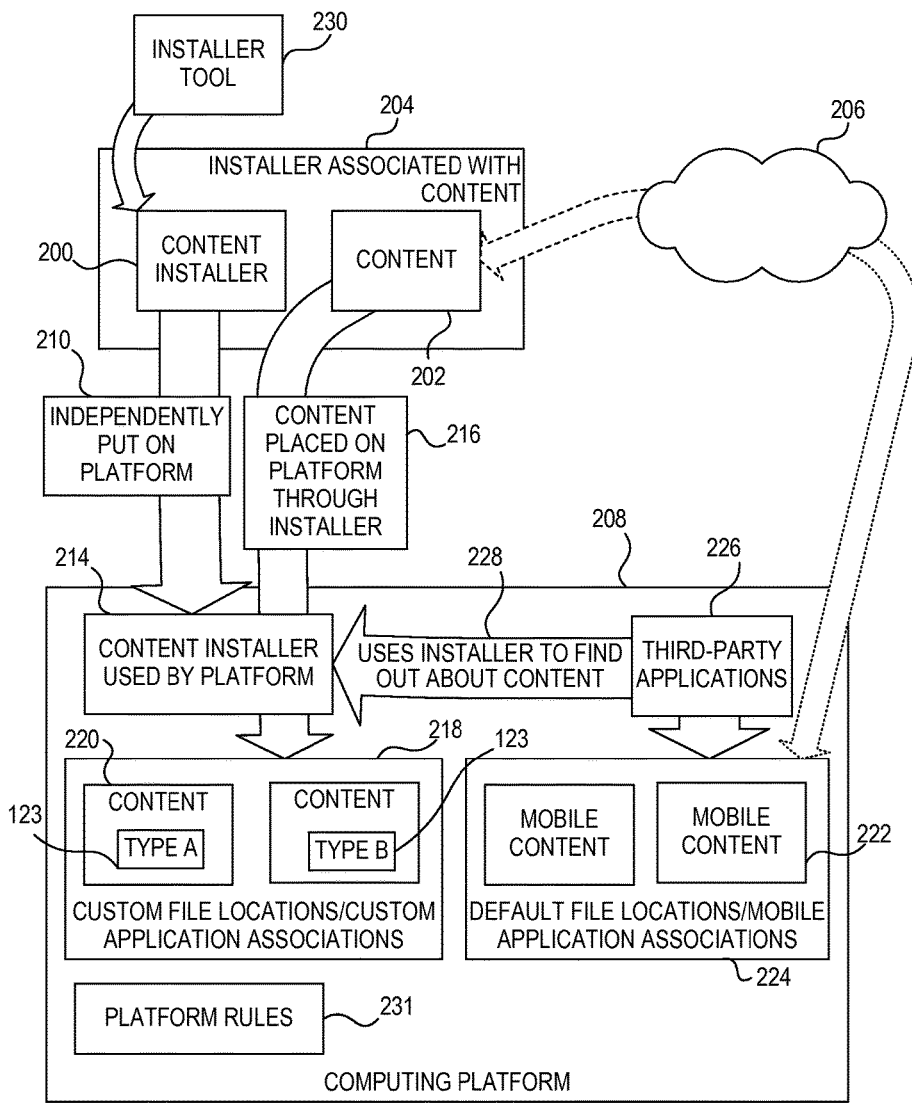
FIG. 2 illustrates a mobile network distributing a dynamic content installer, associated with content, to a computing platform, according to another aspect.

In FIG. 2, in an exemplary aspect, a dynamic content installer 200 (e.g., installation utility 118, FIG. 1) is associated with content 202 (e.g., content item 104, FIG. 1) as depicted at 204. In one aspect, a mobile network 206 (e.g., cellular, wireless, etc.) can distribute the dynamic content installer 200 independently of the content 202 to a computing platform 208 (e.g., of a mobile device, communication device, etc.) as depicted at block 210. When installed, the dynamic content installer 200 is used by the computing platform 208 in order to access content management information manage installation and/or use of the content 202, such as based on content management information 110 and/or usage information 111 (FIG. 1), as depicted at 214.

For instance, as depicted in block 216, when content 202 is placed on the computing platform 208 through the dynamic content installer 200, the dynamic content installer 200 is executable by the computing platform 208 to determine one or more of: a type of the content (e.g., Multipurpose Internet Mail Extensions (MIME) type; where to place the content; what access rights the computing platform may put on the content (read, write, delete, etc.); and licensing/signature/security Meta-data related to usage of the content. The computing platform 208 can thereby create custom file locations and/or custom application associations, as depicted at 218, for storing content 202 as segregated or custom content items 220.

In contrast, the mobile network 206 can also distribute (as depicted at 221) mobile content items 222 that are identical or similar in type or function to the segregated or custom content items 220. Without the benefit of the dynamic content installer 200, the computing platform 208 reverts to default storage and usage, such as based on pre-installed code, for mobile file locations, mobile application associations or default storage location, as depicted 224. Third-party applications 226 (e.g., application 136, FIG. 1) on the computing platform 208 can utilize these default locations and associations to access and use the mobile content items 222 (e.g., ring tones, user interface wallpaper, games, personal organizer utilities, etc.).

However, in some instances, at least one of the third-party applications 226 can utilize the dynamic content installer 200 as an API to find out about the segregated or custom content items 220, as depicted at 228. Accordingly, execution of the dynamic content installer 200 enables content installation and usage that goes beyond the default capabilities of the computing platform 208.

For instance, the dynamic content installer 200 can describe to the third-party applications 226 one or more of: a type of content (e.g., MIME type), where to access the content, what access rights are associated with the content, and any applicable licensing, signature, security information about the type of Data Rights Management (DRM), if any, employed on the content when on device, or any other usage related information corresponding to the content.

Thus, the dynamic content installer 200 is executable by the computing platform 208 to manage content installation and/or usage independent of any pre-installed code or default functionality of the computing platform 208. Thereby, the dynamic content installer 200 may be utilized in the mobile environment of many different types of platforms 208, as the dynamic content installer 200 may be executed in a customized manner independent of any pre-installed code typically associated with content.

In one aspect, a dynamic content installer 200 can be a programmatic application, meta-data or a mixture of both. The dynamic content installer 200 can be dynamically loaded onto computing platform 208 and may be independent of the actual content that it describes or manages. Thus, the dynamic content installer 200 can be downloaded before or with the associated content.

Further, according to one or more aspect, the computing platform 208 needs no prior knowledge of how to install the content 202 associated with a dynamic content installer 200. The computing platform 208 may obtain content management information 110 and/or usage information 111, as well as destination storage location 122 for the content 202 from the dynamic content installer 200.

In an example use case, which should not be construed as limiting, a content developer can create content 202 and a dynamic content installer 200 corresponding to the content 202, such as by using an installer tool 230 (e.g., design interface 116, FIG. 1) to aid in creating the dynamic content installer 200. Further, application developers can create the third-party applications 226 that may access the content 202. The computing platform 208 provides platform rules 231 for the dynamic content installer 200 to abide with, such as but not limited to one or more of: what places in the memory or file system (FS) are allowable for content; or which access rights can be used.

The installer tool 230 can ensure that platform rules 231 are implemented. Developers of content 202 can use the installer tool 230 to create the dynamic content installer 200 for the computing platform 208. In such aspect, the dynamic content installer 200 can be dynamically loaded onto the computing platform 208 with or independently from the content 202, the content management information 110, the usage information 111, or the destination storage location 122.

For instance, the dynamic content installer 200, which can be the installer utility 118 (FIG. 1), can provide content management information, such as installation information 110, usage information 111, and destination storage location 122 for more than one type 123 of custom content item 220.

In a specific usage example, which is not to be construed as limiting, consider content related to a golf course. A content provider could create all the graphical assets and coordinate vectors for a number of real or fictional golf courses. This content provider may use the installer tool to create a content installer for the golf course content, which may be identified by a specific content type. Various types of device computing platforms may use the content installer to know how to install the golf course content, or the associated specific content type, and make it available to one or more third-party golfing applications. Examples of such third-party golfing applications may include, but are not limited to, golf games, golfing aids, mapping tools, etc. Thus, a computing platform or mobile device may include third-party golfing applications and the golf course content. Any of these third-party golfing applications interested in the golf course content may use the content installer to learn about and/or use the golf course content. For instance, a third-party application that is intended for use on a number of types of computing platforms can be configured to look for the installation utility in order to interact with custom content. Thereby, the developer of the third-party application need not configure the third-party application necessarily for each and every type of computing platform in order to use this custom content.

Accordingly, in an aspect, the dynamic content installer can thus go beyond a simplistic package format that merely decompresses content to the location that the content was compressed from or to a single directory. For instance, the dynamic content installer can specify playback parameters for media content. The dynamic content installer can enforce license policy for what actions can be performed with the content. The dynamic content installer can overcome limitations for computing platforms that either have "hard-coded" information about installation and/or usage of a content type or that simply unpack content in a common area. Thereby, the dynamic content installer provides greater flexibility for computing platforms to accept new types of content and/or to accept new installation and usage methods for existing types of content. Accordingly, in an aspect, a wider variety of content types can be accommodated on computing platforms without necessarily changing the computing platforms. Further, in an aspect, a variety of different applications can use the same content by interrogating the dynamic content installer, without having prior knowledge of the content "hard-coded" in programming on the computing platform.

Figure 3:
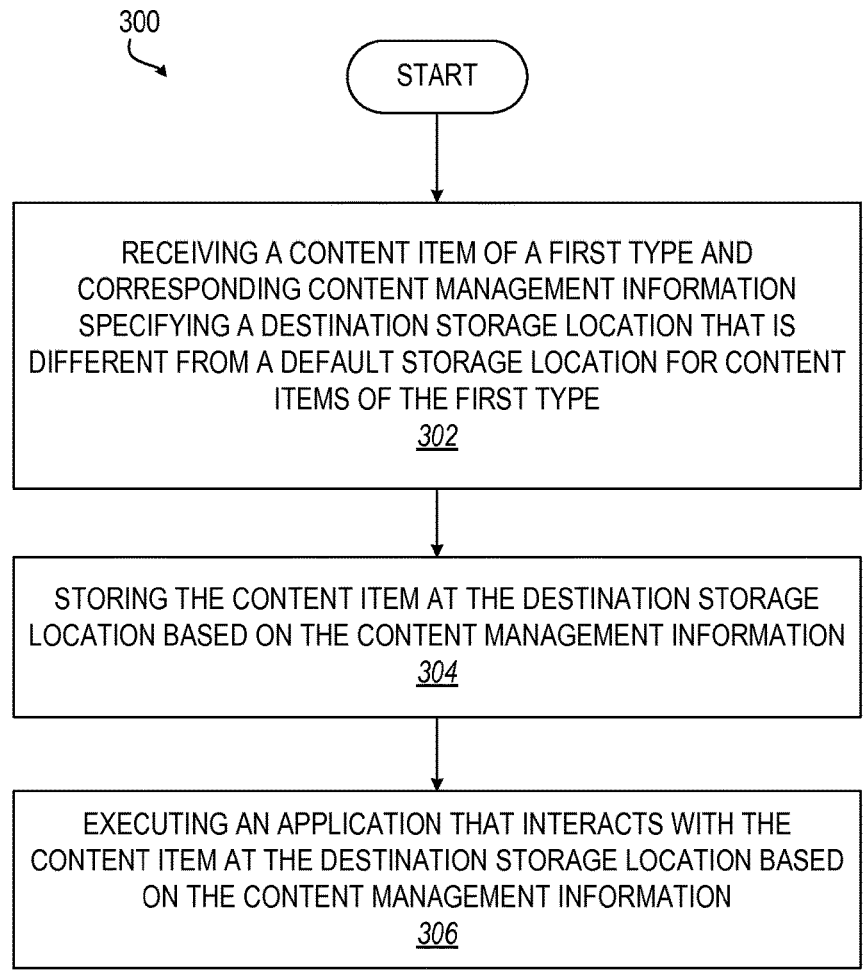
FIG. 3 illustrates a flow diagram of a method for obtaining a content item in a mobile environment, according to yet another aspect.

In FIG. 3, the present disclosure provides a method 300 for obtaining a content item in a mobile environment. The method 300 includes receiving, such as by a communication device, a content item of a first type having corresponding content management information specifying a destination storage location that is different from a default storage location for content items of the first type (block 302). The method 300 further includes storing, such as by a utility, the content item on the communication device at the destination storage location based on the content management information (block 304). Additionally, the method 300 includes executing, such as on the computing platform of the communication device, an application that interacts with the content item at the destination storage location based on the content management information (block 306).

In one aspect, the utility further comprises an application programming interface that communicates the content management information to the application. In a particular aspect, the application programming interface further communicates the destination storage location to the application. For another example, the application programming interface communicates license rights to the application. For an additional aspect, the application program interface further communicates usage information for the content item to the application.

In another aspect, the utility is received with the content item.

In an additional aspect, the utility receives a second content item of a second type that is associated with second content management information. In an exemplary aspect, the utility stores, based on the second content management information, the second content item on the communication device at the second destination storage location. In another example, the utility further comprises an application programming interface that communicates the second content management information to the application.

Figure 4:
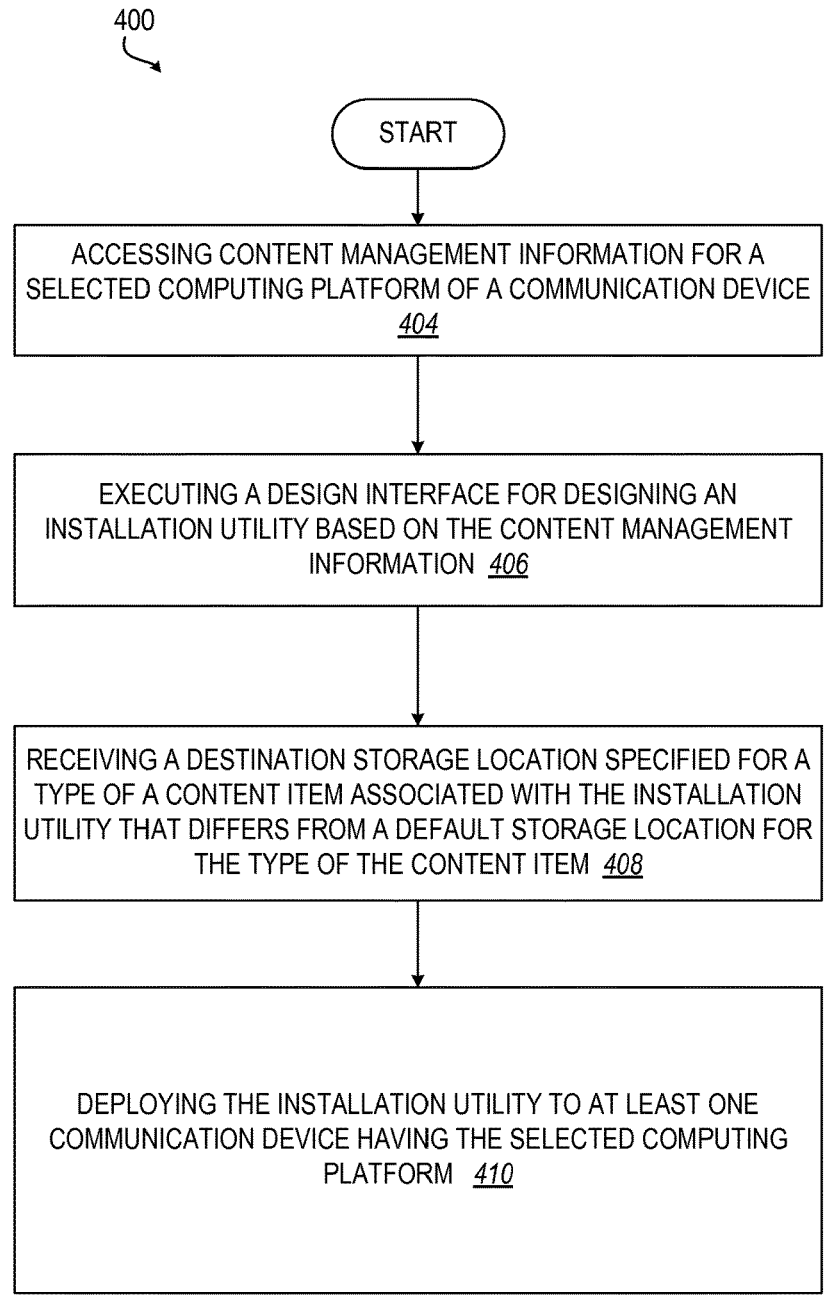
FIG. 4 illustrates a flow diagram of a method for distributing content in a mobile environment, according to still another aspect.

In FIG. 4, the present disclosure provides a method 400 for distributing content in a mobile environment. The method 400 includes accessing content management information for a selected computing platform of a communication device (block 404). Further, the method 400 includes executing a design interface for designing an installation utility based on the content management information (block 406). Also, the method 400 includes receiving a destination storage location specified for a type of a content item associated with the installation utility that differs from a default storage location for the type of the content item (block 408). Additionally, the method 400 includes deploying the installation utility to at least one communication device having the selected computing platform. In this aspect, the installation utility is capable of storing a received content item having a same type as the type of the content item at the destination storage location based on the content management information (block 410).

In one aspect, the content management information can further specify an application programming interface for using the content item. The method 400 thus further comprises sending the installation utility including the application programming interface to communicate between an application executing on the computing platform and the destination storage location.

In another aspect, the content management information can further comprise a license right for the content item for managing by the installation utility.

In one aspect, generating the installation utility for managing the content item on the computing platform of the communication device per the content management information includes incorporating the content management in the installation utility.

Alternatively, some aspects may include sending the content item with the content management information to the at least one communication device subsequent to sending the installation utility to the at least one communication device.

Figure 5:
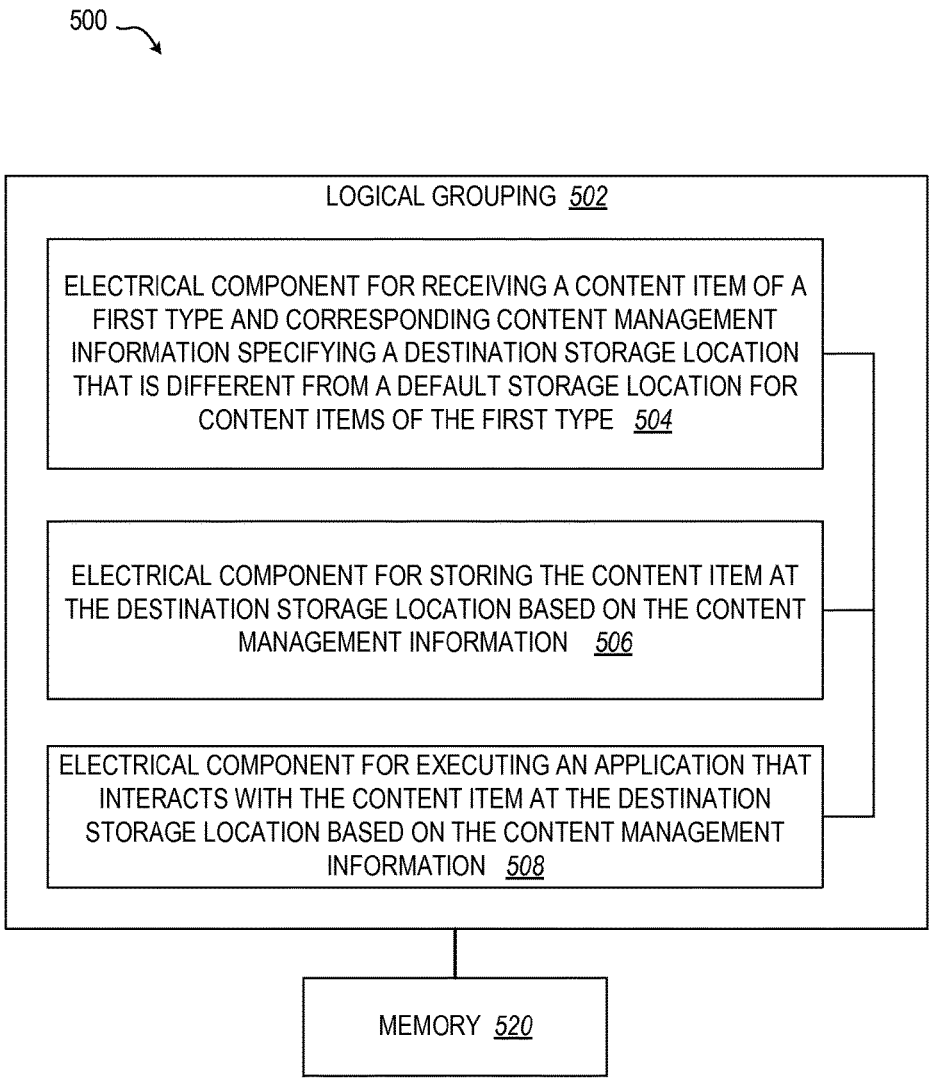
FIG. 5 illustrates a schematic diagram of a system of logical grouping of electrical component for obtaining a content item in a mobile environment, according to one aspect.

With reference to FIG. 5, illustrated is a system 500 for obtaining a content item in a mobile environment. For example, system 500 can reside at least partially within user equipment. It is to be appreciated that system 500 is represented as including functional blocks, which can be functional blocks that represent functions implemented by a computing platform, processor, software, or combination thereof (e.g., firmware). System 500 includes a logical grouping 502 of electrical component that can act in conjunction. For instance, logical grouping 502 can include an electrical component 504 for receiving a content item of a first type and corresponding content management information specifying a destination storage location that is different from a default storage location for content items of the first type. For another instance, logical grouping 502 can include an electrical component 506 for storing the content item at the destination storage location based on the content management information. Also, logical grouping 502 can include an electrical component 508 for executing an application that interacts with the content item at the destination storage location based on the content management information. Additionally, system 500 can include a memory 520 that retains instructions for executing functions associated with electrical component 504-508. While shown as being external to memory 520, it is to be understood that one or more of electrical component 504-508 can exist within memory 520.

Figure 6:
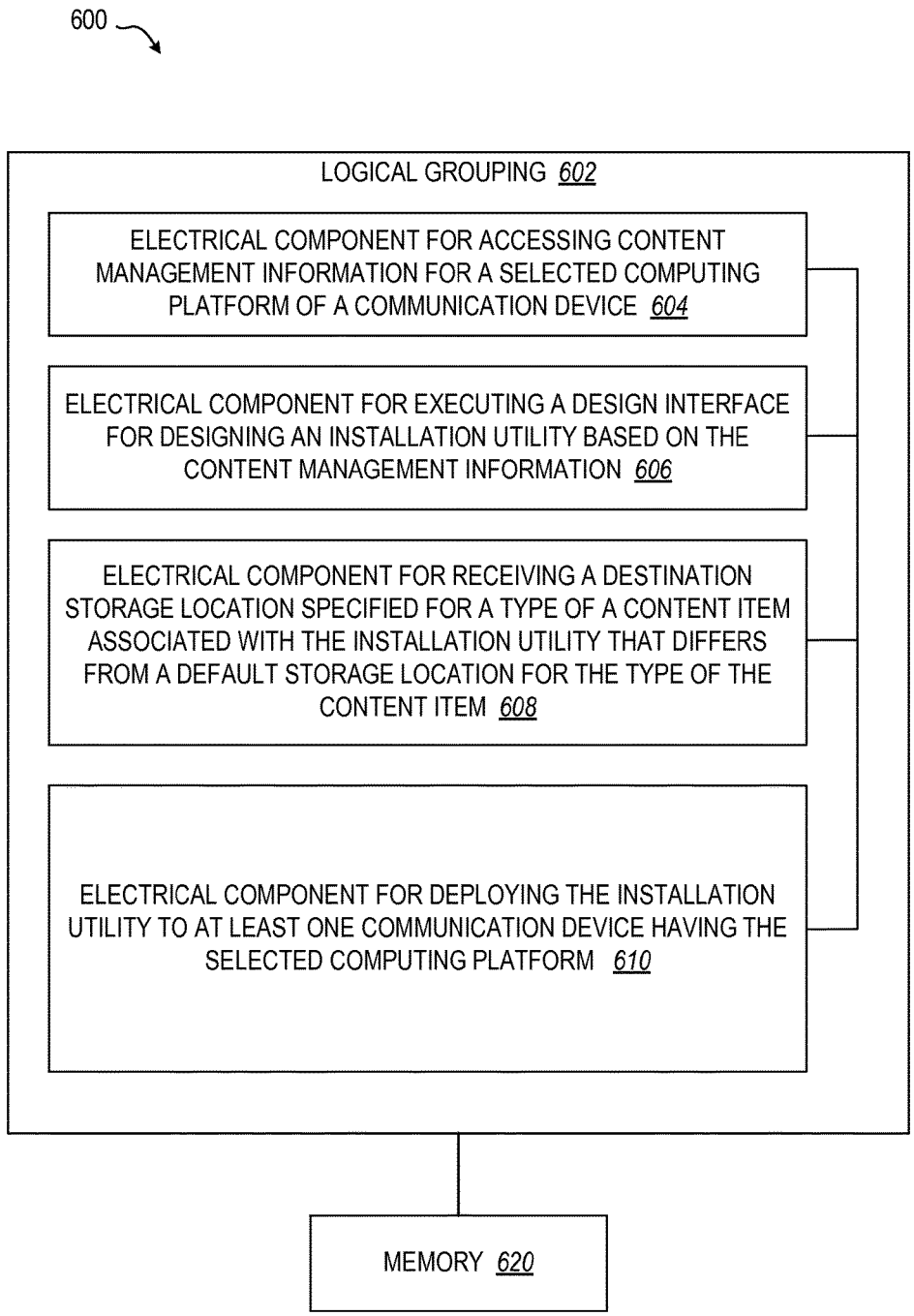
FIG. 6 illustrates a schematic diagram of a system of logical grouping of electrical component for distributing content in a mobile environment, according to another aspect.

With reference to FIG. 6, illustrated is a system 600 for distributing a content item in a mobile environment. For example, system 600 can reside at least partially within user equipment. It is to be appreciated that system 600 is represented as including functional blocks, which can be functional blocks that represent functions implemented by a computing platform, processor, software, or combination thereof (e.g., firmware). System 600 includes a logical grouping 602 of electrical component that can act in conjunction. For instance, logical grouping 602 can include an electrical component 604 for accessing content management information for a selected computing platform of a communication device. For another instance, logical grouping 602 can include an electrical component 606 for executing a design interface for designing an installation utility based on the content management information. For an additional instance, logical grouping 602 can include an electrical component 608 for receiving a destination storage location specified for a type of a content item associated with the installation utility that differs from a default storage location for the type of the content item. For a further instance, logical grouping 602 can include an electrical component 610 for deploying the installation utility to at least one communication device having the selected computing platform, wherein the installation utility is capable of storing a received content item having a same type as the type of the content item at the destination storage location based on the content management information. Additionally, system 600 can include a memory 620 that retains instructions for executing functions associated with electrical component 604-610. While shown as being external to memory 620, it is to be understood that one or more of electrical component 604-610 can exist within memory 620.

Figure 7:
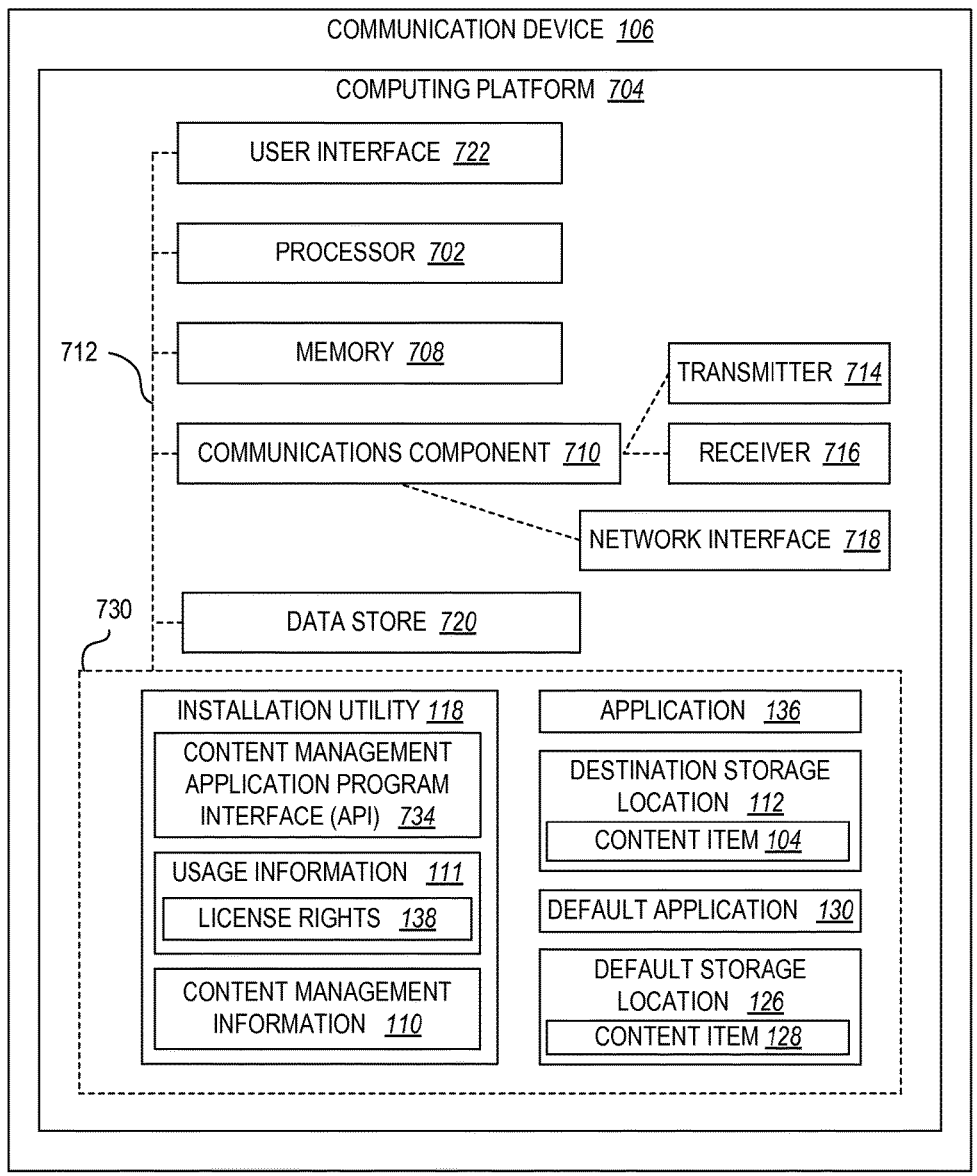
FIG. 7 illustrates a schematic diagram for an apparatus employing a processing system that receives content in a mobile environment, according to still another aspect.

Referring to FIG. 7, in one aspect, the communication device 106 (FIG. 1) may include a processor 702 for carrying out processing functions associated with one or more of components and functions described herein. Processor 702 can include a single or multiple set of processors or multi-core processors as part. Moreover, processor 702 can be implemented as an integrated processing system and/or a distributed processing system, depicted as a computing platform 704.

Communication device 106 further includes a memory 708, such as for storing local versions of applications being executed by processor 702. Memory 708 can include any type of memory usable by a computer, such as random access memory (RAM), read only memory (ROM), tapes, magnetic discs, optical discs, volatile memory, non-volatile memory, and any combination thereof.

Further, communication device 106 includes a communications component 710 that provides for establishing and maintaining communications with one or more parties utilizing hardware, software, and services as described herein. Communications component 710 may carry communications between components on communication device 106, as well as between communication device 106 and external devices, such as devices located across a communications network and/or devices serially or locally connected to communication device 106. For example, communications component 710 may include one or more buses 712, and may further include transmit chain components and receive chain components associated with a transmitter 714 and a receiver 716, respectively, operable for interfacing with external devices. For another example, communications component 710 may communicate to external devices via a network interface 718.

Additionally, communication device 106 may further include a data store 120, which can be any suitable combination of hardware and/or software, that provides for mass storage of information, databases, and programs employed in connection with aspects described herein. For example, data store 720 may be a data repository for applications not currently being executed by processor 702.

Communication device 106 may additionally include a user interface component 722 operable to receive inputs from a user of communication device 106, and further operable to generate outputs for presentation to the user. User interface component 722 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 722 may include one or more output devices, including but not limited to a display, a speaker, a haptic feedback mechanism, a printer, any other mechanism capable of presenting an output to a user, or any combination thereof.

Resident in memory 708, data store or both, a content management system 730 includes the installation utility 118 having a content management application programming interface (API) 734 for applications 136 to access the content items 104 in destination storage location 122. Content management information 110 can provide additional information about how to use the content item 104, such as including usage information 111 with license rights 138. Default applications 130 are still able to access the content items 128 in the default storage location 126 without having to be adapted.

Figure 8:
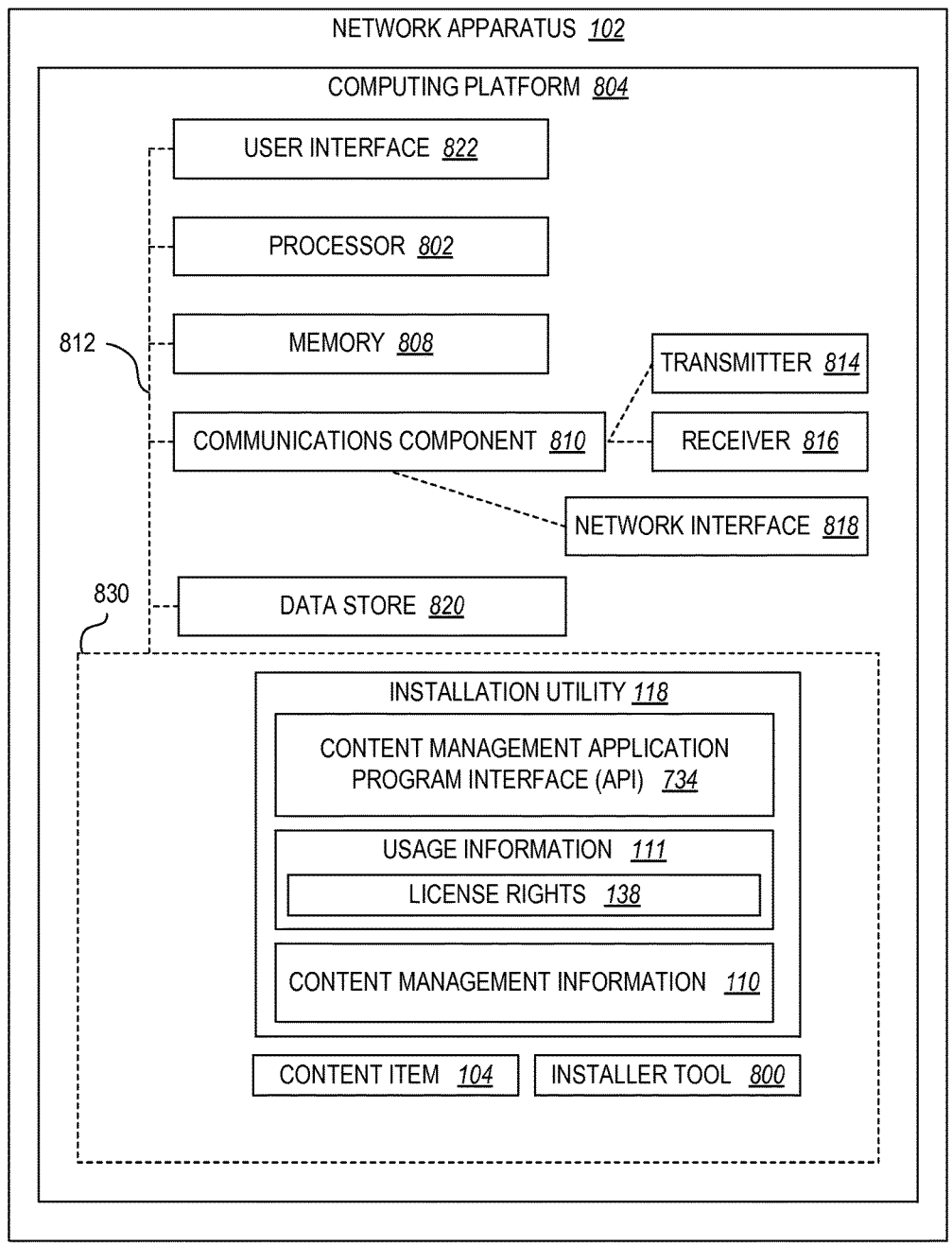
FIG. 8 illustrates a schematic diagram for an apparatus employing a processing system that distributes content in a mobile environment, according to yet another aspect.

Referring to FIG. 8, in one aspect, the network apparatus 102 (FIG. 1) may include a processor 802 for carrying out processing functions associated with one or more of components and functions described herein. Processor 802 can include a single or multiple set of processors or multi-core processors as part. Moreover, processor 802 can be implemented as an integrated processing system and/or a distributed processing system, depicted as a computing platform 804.

Network apparatus 102 further includes a memory 808, such as for storing local versions of applications being executed by processor 802. Memory 808 can include any type of memory usable by a computer, such as random access memory (RAM), read only memory (ROM), tapes, magnetic discs, optical discs, volatile memory, non-volatile memory, and any combination thereof.

Further, network apparatus 102 includes a communications component 710 that provides for establishing and maintaining communications with one or more parties utilizing hardware, software, and services as described herein. Communications component 710 may carry communications between components on network apparatus 102, as well as between network apparatus 102 and external devices, such as devices located across a communications network and/or devices serially or locally connected to network apparatus 102. For example, communications component 810 may include one or more buses 812, and may further include transmit chain components and receive chain components associated with a transmitter 814 and a receiver 816, respectively, operable for interfacing with external devices.

For another example, communications component 810 may communicate to external devices via a network interface 818.

Additionally, communication device 106 may further include a data store 820, which can be any suitable combination of hardware and/or software, that provides for mass storage of information, databases, and programs employed in connection with aspects described herein. For example, data store 820 may be a data repository for applications not currently being executed by processor 802.

Network apparatus 102 may additionally include a user interface component 822 operable to receive inputs from an operator of network apparatus 102 and further operable to generate outputs for presentation to the user. User interface component 822 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 822 may include one or more output devices, including but not limited to a display, a speaker, a haptic feedback mechanism, a printer, any other mechanism capable of presenting an output to a user, or any combination thereof.

Resident in memory 808, data store or both, a content management system 830 for deploying to communication devices 106 (FIG. 1) includes the installation utility 118 having the content management API 734. Content management information 110 can provide additional information about how to use a content item 104, which may be bundled with or separately provided. Usage information 111 with license rights 138 can also be included.

In summary, it is recognized that, in general, mobile computing platforms dictate where some content items are to be installed (e.g., ring tones in a default "/ringer" directory, etc.), mobile computing platforms require a significant change when a new type of content item is introduced, e.g. adding a new directory, or that a content provider can intend for a known type of content item to be used in a different manner and not be limited to the reserved use corresponding to the associated default directory. With this insight, the present disclosure contemplates a way to generically define dynamic installation of many different types of content items on mobile computing platforms responsive to a changing focus in the communication device industry, as the industry moves from content item distribution to content item discovery and increasing types of content items. To that end, a solution is provided so that mobile computing platforms can be more generic in their treatment of content items by obtaining instructions on how to install any specific content item rather than defaulting to an installation procedure based merely on a file type.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a server and the server can be a component. One or more components may reside within a process or thread of execution and a component may be localized on one computer or distributed between two or more computers.

In addition, the term application as used herein refers to computer software program in general and can further encompass data, configuration settings, etc., used by the computer software program. Examples include utilities such as e-mail, Short Message Service (SMS) text utility, chat interface, web browsers, calculators, viewers, media players, games, etc. In an exemplary aspect, application can refer to software that is suitable for use on a mobile device or communication device, especially to being downloaded via a Wireless Local Access Network (WLAN) or Wireless Wide Area Network (WWAN).

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. or may not include all of the components, modules, etc. discussed in connection with the figures. A combination of these approaches may also be used. The various aspects disclosed herein can be performed on electrical devices including devices that utilize touch screen display technologies or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the aspects shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for obtaining a content item by a communication device in a mobile environment, comprising:
receiving, from an external network apparatus, a content item of a first type of media content and content management information that corresponds to the content item, wherein the received content management information includes a destination storage location for storing the content item of the first type, wherein the destination storage location is allowed by at least one of a memory or a file system of the communication device and is different from a default storage location mandated by the communication device for storing content items of the first type of media content;
storing, by a utility, the content item on the communication device at the destination storage location specified in the received content management information; and
executing an application on a computing platform of the communication device, wherein the application interacts with the content item at the destination storage location specified in the received content management information.

2. The method of claim 1, wherein the utility further comprises an application programming interface, and wherein the method further comprises communicating the content management information to the application via the application programming interface.

3. The method of claim 2, wherein communicating the content management information further comprises communicating the destination storage location to the application.

4. The method of claim 2, wherein communicating the content management information further comprises communicating one or more license rights to the application.

5. The method of claim 2, wherein communicating the content management information further comprises communicating usage information for the content item to the application.

6. The method of claim 1, further comprising receiving the utility with the content item.

7. The method of claim 1, further comprising receiving a second content item of a second type of media content, wherein the second content item is associated with second content management information.

8. The method of claim 7, further comprising storing, by the utility, the second content item on the communication device at a second destination storage location specified in the received second content management information.

9. The method of claim 7, wherein the utility further comprises an application programming interface, and wherein the method further comprises communicating the second content management information to the application via the application programming interface.

10. At least one processor of a communication device for obtaining a content item in a mobile environment, comprising:
a first module for receiving, from an external network apparatus, a content item of a first type of media content and content management information that corresponds to the content item, wherein the received content management information includes a destination storage location for storing the content item of the first type, further wherein the destination storage location is allowed by at least one of a memory or a file system of the communication device and is different from a default storage location mandated by the communication device for storing content items of the first type of media content;
a second module for storing the content item on the communication device at the destination storage location specified in the received content management information; and
a third module for executing an application, wherein the application interacts with the content item at the destination storage location specified in the received content management information.

11. A non-transitory computer-readable storage medium having stored thereon processor executable instructions configured to cause a processor of a first mobile communication device to perform operations comprising:
receiving, from an external network apparatus, a content item of a first type of media content and content management information that corresponds to the content item, wherein the received content management information includes a destination storage location for storing the content item of the first type, and further wherein the destination storage location is allowed by at least one of a memory or a file system of the communication device and is different from a default storage location mandated by the first mobile communication device for storing content item of the first type of media content;
storing the content item on the first mobile communication device at the destination storage location specified in the received content management information; and
executing an application, wherein the application interacts with the content item at the destination storage location specified in the received content management information.

12. A communication device for obtaining a content item in a mobile environment, comprising:
means for receiving, from an external network apparatus, a content item of a first type of media content and content management information that corresponds to the content item, wherein the received content management information includes a destination storage location for storing the content item of the first type, wherein the destination storage location is allowed by at least one of a memory or a file system of the communication device and is different from a default storage location mandated by the communication device for storing content items of the first type of media content;
means for storing the content item on the communication device at the destination storage location specified in the received content management information; and
means for executing an application, wherein the application interacts with the content item at the destination storage location specified in the received content management information.

13. An apparatus for obtaining a content item in a mobile environment, comprising:
a file system for storing one or more content items;
a receiver for receiving, from an external network apparatus, a content item of a first type of media content and content management information that corresponds to the content item, wherein the received content management information includes a destination storage location for storing the content item of the first type, wherein the destination storage location is allowed by at least one of a memory or a file system of the communication device and is different from a default storage location mandated for storing content items of the first type of media content;

a utility for storing the content item at the destination storage location specified in the received content management information; and a computing platform for executing an application, wherein the application interacts with the content item at the destination storage location specified in the received content management information.

14. The apparatus of claim 13, wherein the utility further comprises an application programming interface capable of communicating the content management information to the application.

15. The apparatus of claim 14, wherein the application programming interface is further capable of communicating the destination storage location to the application.

16. The apparatus of claim 14, wherein the application programming interface is further capable of communicating one or more license rights to the application.

17. The apparatus of claim 14, wherein the application programming interface is further capable of communicating usage information for the content item to the application.

18. The apparatus of claim 13, wherein the utility is received with the content item.

19. The apparatus of claim 13, further comprising a second content item of a second type of media content that is associated with second content management information.

20. The apparatus of claim 19, wherein the utility is further capable of storing the second content item at a second destination storage location specified in the received second content management information type.

21. The apparatus of claim 19, wherein the utility further comprises an application programming interface capable of communicating the second content management information to the application.

* * * * *